United States Patent

Zapfe

[15] 3,675,476
[45] July 11, 1972

[54] INK BLEED TESTER

[72] Inventor: Paul C. Zapfe, Green Bay, Wis.
[73] Assignee: Fort Howard Paper Company
[22] Filed: June 5, 1970
[21] Appl. No.: 43,703

[52] U.S. Cl. .......................................... 73/150, 73/159
[51] Int. Cl. ................................ G01n 33/34, G01n 33/36
[58] Field of Search ...................... 73/159, 150; 26/70

[56] References Cited

UNITED STATES PATENTS 3,063,285  11/1962  Hunderup Jensen ............... 73/150 X
2,660,055  11/1953  Thommen ............................ 73/159

*Primary Examiner*—Louis R. Prince
*Assistant Examiner*—Denis E. Corr
*Attorney*—Molinare, Allegretti, Newitt & Witcoff

[57] ABSTRACT

A device for testing printed fibrous material, such as paper napkins and the like for resistance to ink bleed. The device includes a base and a support on the base for receiving the material to be tested while pressure is applied to the material, when it is stationary, for determining bleed resistance of the fibrous test material as it is undergoing static pressure. Means are also provided for pulling adjacent material through the receiving means while pressure is being applied to the test material, so as to determine the resistance of the test material to dynamic pressure or rubbing.

6 Claims, 5 Drawing Figures

Inventor:
Paul C. Zapfe
By Molinare, Allegretti,
Newitt & Witcoff
Attys.

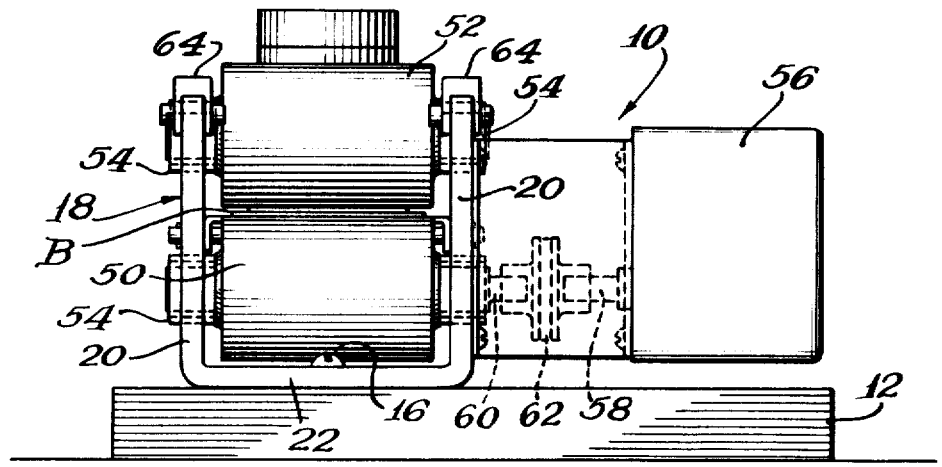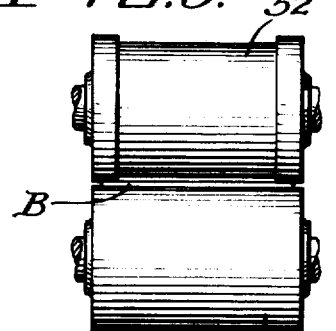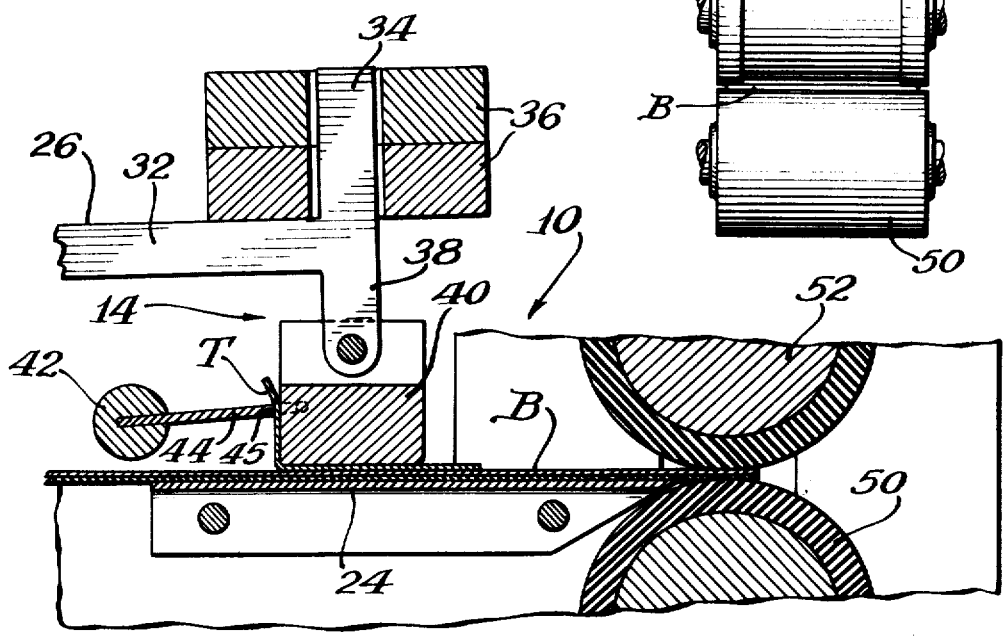

INK BLEED TESTER

BACKGROUND OF THE INVENTION

FIELD OF THE INVENTION

DESCRIPTION OF THE PRIOR ART

This invention relates to a device for testing fibrous materials with printing thereon, such as printed paper napkins, paper towels, or the like, for bleed resistance and rubbing resistance.

In the paper industry, many paper products with printing thereon are manufactured wherein the printed paper product is likely to come into contact with and even become saturated with various materials, such as water, grease, oil, alcohol, etc. The printed material may constitute advertising, matters of general interest, maps, decoration, art work, or the like. The printing may be on paper toweling, napkins, place mats, or the like. With such printed paper products, the product often becomes saturated with water, alcohol, grease, etc. When this occurs, it is considered highly undesirable for the ink in the paper product to "run" or "bleed" onto other parts of the paper product or onto adjacent materials. This would not only produce an unsightly condition, but the ink could bleed onto an adjacent material, which would be highly undesirable.

Therefore, it has been the practice to determine manually, on a random sample basis, whether a particular printed paper product is resistant to bleeding of the printed material either under static or dynamic conditions, as by rubbing, particularly when saturated with various liquids, such as alcohol, water, oil, etc. The only known method by which this test has been carried out is simply to manually hold the sample product and rub the sample against another material to see if the ink bleeds, and is indeed resistant to bleeding of the ink.

Such a manual test method is quite undesirable because of the widely different pressures and speeds with which the tests are carried out. On individual, for example, might rub the paper product with greater pressure and greater speed than another individual. It is therefore virtually impossible to have any meaningful standards as to what is and is not an acceptable amount of bleeding because the products simply have not been tested under uniform conditions.

SUMMARY OF THE INVENTION

It is therefore an important object of this invention to provide a unique device which tests a printed paper product for resistance to ink bleeding, both under static and dynamic conditions wherein the testing is standardized.

It is also an object of this invention to provide a testing device for determining the bleeding and rub resistance qualities of printed paper products wherein uniform pressure is applied to the product both during static and dynamic testing and wherein a preselected uniform speed is applied to the product during dynamic testing for determining rub resistance.

It is a further object of this invention to provide an improved ink bleed and rub testing device which is particularly characterized by its simplicity and economy of construction, manufacture, and operation.

Further purposes and objects of this invention will appear as the specification proceeds.

The foregoing objects are accomplished by providing a testing device for determining ink bleed and rub resistance of printed fibrous materials wherein the device includes a base, means on the base for holding the fibrous material while static pressure is applied to the test material to determine the bleed resistance thereof, and means are provided for relatively moving an adjacent material and the fibrous test material while pressure is being applied to the relatively moving materials to determine the rub resistance of the test material.

BRIEF DESCRIPTION OF THE DRAWINGS

A particular embodiment of the present invention is illustrated in the accompanying drawings wherein:

FIG. 3 is an end elevational view of the embodiment of FIGS. 1 and 2;

FIG. 4 is a fragmentary, partially sectioned view of the operating parts of the embodiment of FIGS 1–3; and FIG. 5 is a detailed view of an alternate embodiment of the pulling rollers.

DETAILED DESCRIPTION OF THE PREFERRED EMBODIMENT

Figure 1:
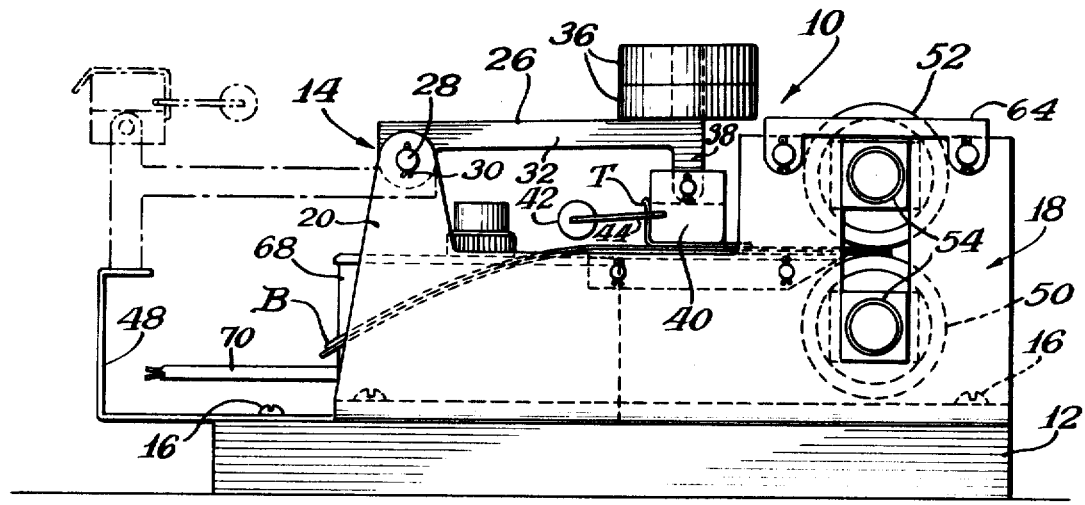
FIG. 1 is a side elevational view of the preferred embodiment of my improved device for ink bleed and rub resistance testing of printed paper products.

Referring to the drawings, my ink bleed and rub resistance testing device, generally 10, used for testing printed fibrous materials, has a base 12 upon which is mounted the testing portion, generally 14. Suitable fasteners, such as screws 16, secure the testing portion 14 to the base 12. Although the testing device 10 finds its most important application in the testing of paper products, such as towels, napkins, place mats, etc., it is to be understood that other fibrous materials, such as printed cloth products may also be tested with the device 10.

The testing portion 14 includes a generally upright support frame 18, having upright sides 20 which are interconnected by a unitarily formed bottom 22. Fasteners, such as screws 16, pass through the bottom 22 for securement of the frame 18 and thereby the testing portion 14 to the base 12. A test support plate 24 is secured in a horizontal plane between the upright sides 20 in a position generally intermediate the upper and lower ends of the sides 20, as shown most clearly in FIG. 4.

A weight support arm 26 is rotatably carried by the frame sides. The arm 26 is secured to a shaft 28, which, in turn, is rotatably carried by the upright sides 20, as shown best in FIGS. 1 and 2. The shaft 28 is held in engagement with the sides 20 by any suitable means, such as cotter pins 30, mounted at the outer projecting ends of the shaft 28. The arm 26 includes an elongated portion 32 which is mounted at one end to the shaft 28 and the opposite end includes an upright portion 34 for receiving weights 36.

Aligned below the upright portion 34 is a projection 38 which pivotally carries a block member 40 which is provided to hold the test sheet T. As shown, the block member 40 is designed so that its lower surface rests in a substantially flat relationship relative to the flat upper surface of the test plate 24. Although any suitable clamping arrangement may be used, desirably, the block member 40 has an outwardly projecting weighted clamping member 42 pivotally secured thereto. The arm 44 of the weighted clamping member is pivotally mounted to the block 40. The test sheet T is inserted between the side of the block 40 and the clamping edge 45 of the clamp 42 and the test material is placed under the block 40, as best shown in FIG. 4.

A spring support member 48 is mounted on the base 12 for receiving and supporting the weight support arm 26 when it has been pivoted to the open position for insertion of a test piece T on the block 40. The dotted line position of the support arm 26 is shown in the rest position in FIG. 1.

The support plate 24 has a test receiving paper strip B resting thereon and adjacent the test material T. A strip of rubber or like material (not shown) may be inserted between the plate 24 and the paper strip B. The strip B, preferably bond paper or the like, is used in testing to determine whether the test material T will bleed through to an adjacent material, under pressure. Desirably, the test receiving paper or back up paper B has a rubber or plastic support layer of relatively soft material for cushioning and of relatively high friction to feed between rollers 50 and 52.

An idler roller 52 and a driven roller 50 are provided for pulling the back up paper B past the fixed test paper T. The lower roller 50 is rotatably mounted in bearings 54, slidably received in the slotted portion of the sides 20 of the support frame 18. A fractional horse power motor 56 is interconnected by a drive shaft 58 to a shaft 60 of the driven roller 50 by a coupling 62. The upper idler roller 52 is maintained directly above the driven roller 50 and is similarly rotatably mounted on the sides 20 of the support frame 18 in bearings 54. Although springs may be used, the upper idler roller 52 is urged downwardly towards the driven roller 50 by gravity. Removable lock member 64 is mounted in the sides 20 over the bearings 54 holding the rollers 50 and 52 in place. The rollers 50 and 52 desirably have covers of high friction material, such as rubber so that the test receiving paper B may be drawn readily past the fixed test paper T.

Referring to FIG. 5, preferably roller 52 has a recessed central portion so as to avoid roller contact with the ink bleed area of the test receiving paper B.

A switch 68 is mounted on the base 12 and is electrically connected to the motor 56. A power source 70 is connected to the switch box 68 for operating the motor 56. A speed control device (not shown) may be connected in the electrical circuit to adjust the speed of movement.

In the operation of the device 10, the strip of bond paper B or the like, is positioned on the support 24. The test paper T is saturated with the test liquid, such as water, oil, grease, alcohol, etc. The test paper is mounted on the block 40 and clamped in place. Preferably, the test paper T is cut in a 1 inch wide strip so that the desired static and dynamic test pressure may be easily determined as a half pound or a pound per square inch.

Figure 2:
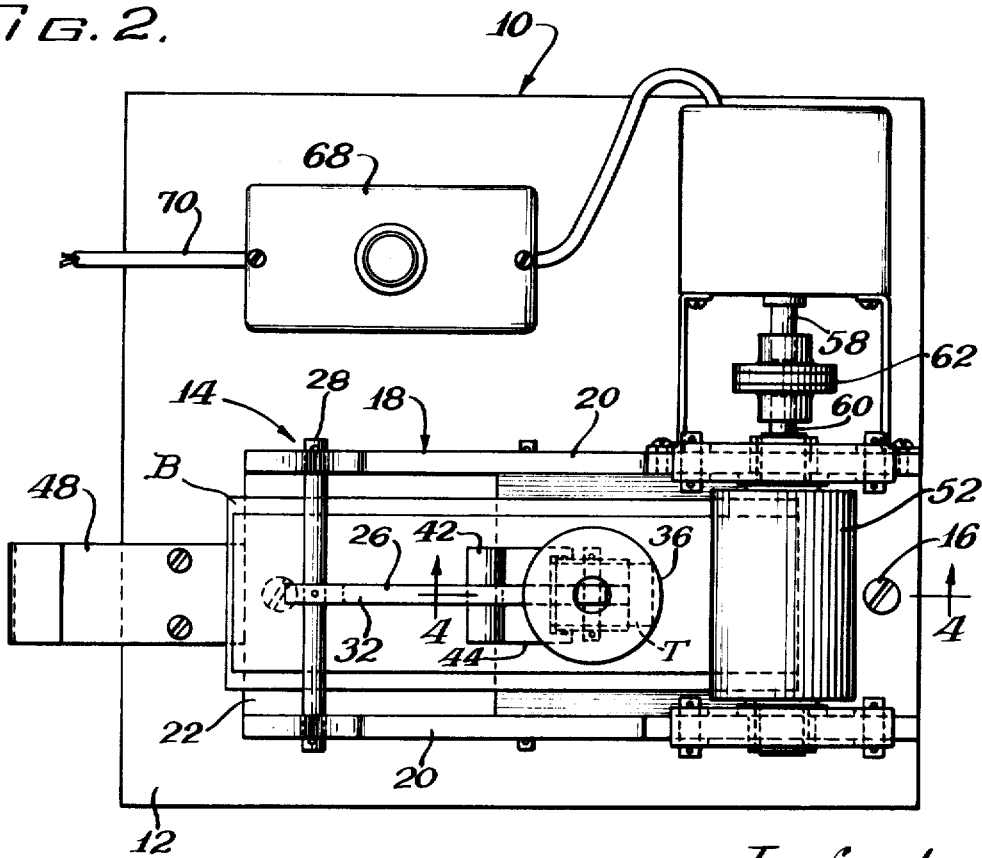
FIG. 2 is a top plan view of the embodiment shown in FIG. 1.

The weight support arm 26 is then pivoted from the dotted line, at rest position shown in FIG. 1, to the full line position shown in FIG. 1. With the block member 40 in position with the test paper T resting against the back up paper B, the desired number of weights 36 are mounted on the upright portion 34 of the arm 26 to provide the desired pressure against the test piece T. When the desired number weights have been applied, a static test is permitted to take place over a predetermined period of time, such as one minute. This static test is the test for resistance to ink bleed and the back up paper B may be examined to determine any bleeding after the preselected time period. The block 40 with the test paper T is then raised slightly, and the rollers 50 and 52, through the motor 56, are rotated by the switch 68 to advance the strip B and 1½ inch. The weighted test block 40 is then lowered with the test paper T in place. The rollers 50 and 52 are again operated so as to pull the paper strip B and move it relative to the test paper T for the dynamic test under pressure. This dynamic test, made at a preselected speed, provides a determination of the rub resistance test. Again, the paper B, as well as the test piece T, are visually observed for ink bleeding.

While in the foregoing there has been provide a detailed description of a particular embodiment of the present invention, it is to be understood that all equivalents obvious to those having skill in the art are to be included within the scope of the invention as claimed.

What I claim and desire to secure by Letters Patent is:

1. A device for testing a printed fibrous material for ink bleed and rub resistance, said device comprising, in combination, a base, means on said base for receiving said fibrous material, other material positioned adjacent said fibrous material, means for applying pressure to said fibrous material for determining bleed resistance thereof relative to said adjacent material, upper and lower roller members rotatably mounted on said base and laterally spaced from said receiving means for relatively moving said fibrous material and said adjacent material for determining rub resistance of said fibrous material relative to said adjacent material, and drive means operatively connected to one of said rollers.

2. The device of claim 1 wherein said fibrous material is stationary and said moving means moves said adjacent material relative to said fibrous material.

3. The device of claim 1 wherein said receiving means includes a fixed portion on said base for receiving said adjacent material, a second portion movably carried on said base for receiving said fibrous material, said fibrous material and said adjacent material being inserted between said fixed portion and said second portion, and means are provided on said second portion for receiving weights for applying a preselected pressure to said fibrous material.

4. The device of claim 1 wherein a nip is defined between said roller members and said adjacent material is received at the nip of said roller members to move said adjacent material relative to said fibrous material.

5. A device for testing a printed fibrous material for ink bleed and rub resistance, said device comprising, in combination, a base, means on said base for receiving said fibrous material, other material positioned adjacent said fibrous material, said receiving means including a first portion mounted on said base for movably receiving said adjacent material, and a second portion mounted on said base for receiving said fibrous material, weights mounted on said second portion for applying pressure to said fibrous material after being positioned between said second portion and said adjacent material, first and second roller members rotatably mounted on said base and laterally spaced from said receiving means for relatively moving said fibrous material and said adjacent material for determining rub resistance of said fibrous material relative to said adjacent material, and drive means for rotating said roller members.

6. The device of claim 5 wherein said roller members receive said adjacent material for moving said adjacent material relative to said fibrous material.

* * * * *